Feb. 2, 1932.    R. H. HOLTON    1,843,130
EQUALIZING MECHANISM FOR AXLE LATHE DRIVE CHUCKS
Filed May 27, 1930    3 Sheets-Sheet 2

Inventor
Robert H. Holton
By Attorney
Southgate Fay & Hawley

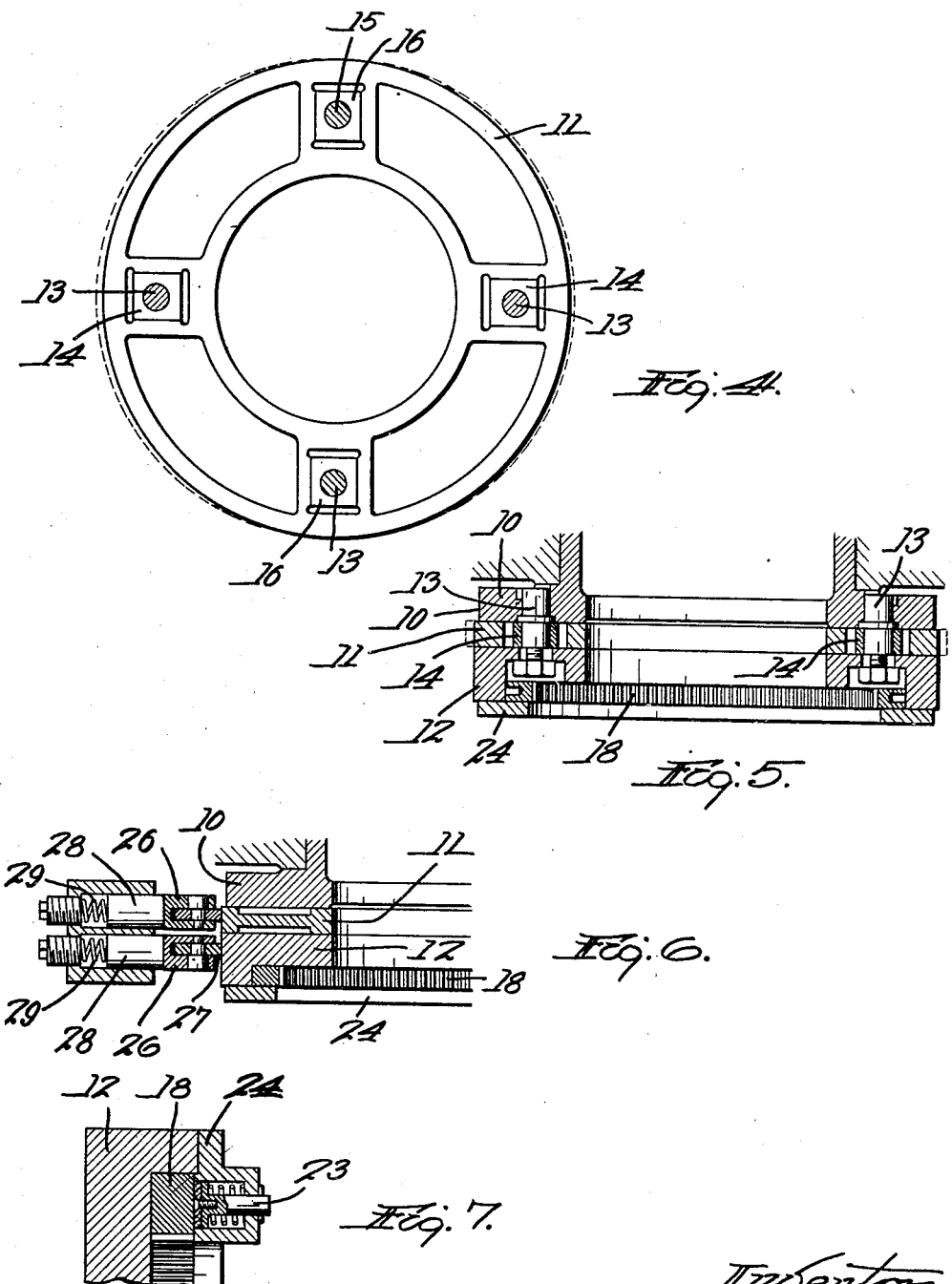

Patented Feb. 2, 1932

1,843,130

UNITED STATES PATENT OFFICE

ROBERT H. HOLTON, OF NORTH LEOMINSTER, MASSACHUSETTS, ASSIGNOR TO MANNING, MAXWELL & MOORE, INC., OF NEW YORK, N. Y., A CORPORATION OF NEW JERSEY

EQUALIZING MECHANISM FOR AXLE LATHE DRIVE CHUCKS

Application filed May 27, 1930. Serial No. 456,203.

This invention relates to improvements in the so-called Powell chuck for center drive axle lathes and the like.

The principal objects of this invention are to provide an improved centering device for the Powell chuck and to provide a centering device comprising brackets at the front and back of the spindle-housing respectively and carrying pivoted arms provided with rolls to come in contact with the movable plates of the chuck on the back and front respectively and yieldingly held in contact with the plates.

Other objects and advantages of the invention will appear hereinafter.

Reference is to be had to the accompanying drawings, in which

Fig. 4 is a sectional view on the line 4—4 of Fig. 3;

Fig. 5 is a diametrical sectional view on the line 5—5 of Fig. 1;

Fig. 6 is a radial sectional view on the line 6—6 of Fig. 1, and

Fig. 7 is a sectional view on the line 7—7 of Fig. 1.

Figure 1:
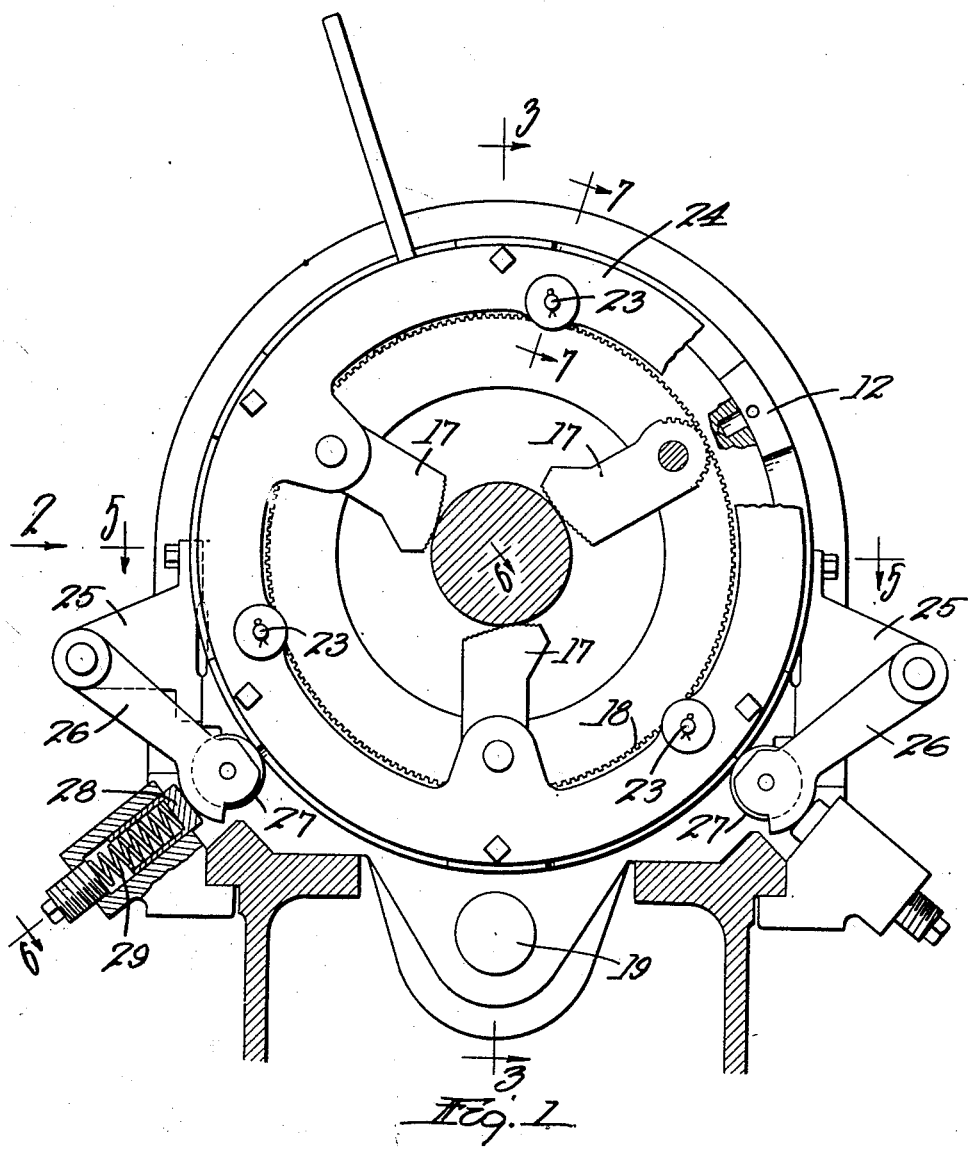
Fig. 1 is a front view of a Powell chuck with a preferred embodiment of this invention applied thereto and shown partly in section.
Figure 2:
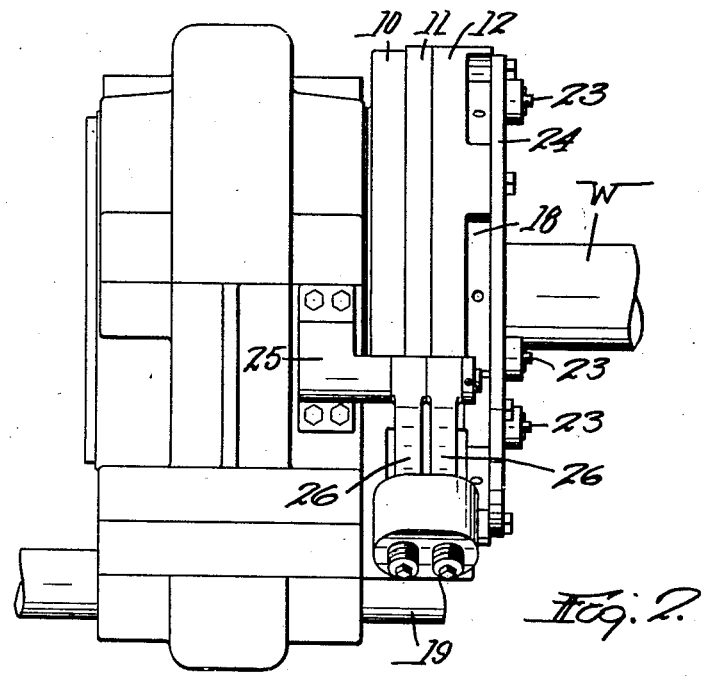
Fig. 2 is a side view as indicated by the arrow 2 in Fig. 1.
Figure 3:
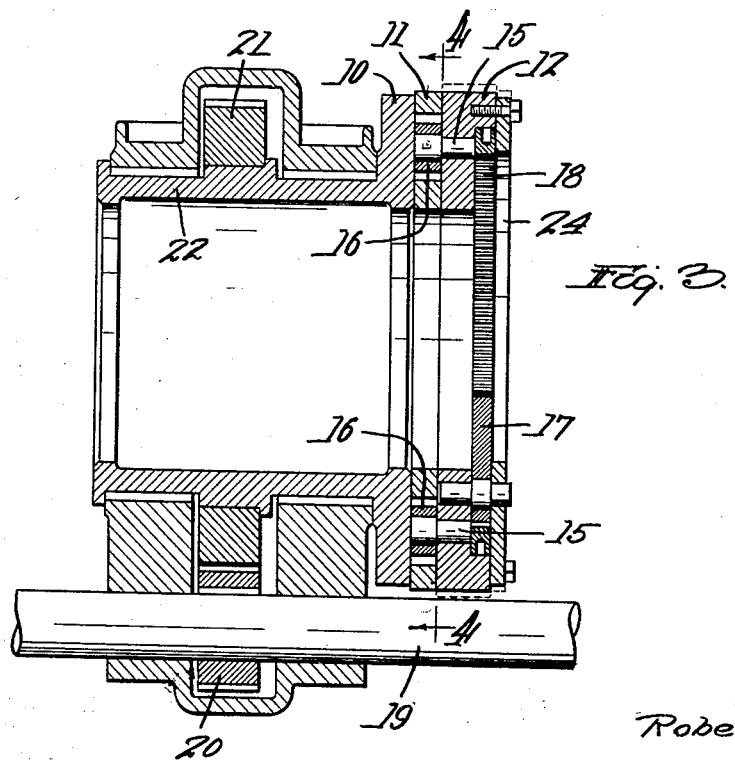
Fig. 3 is a diametrical sectional view as indicated by the line 3—3 of Fig. 1.

This invention is applied to a Powell chuck consisting of three circular plates 10, 11 and 12 assembled together, the inner plate 10 having two studs 13 located at 180° apart, on which are fixed rectangular blocks 14. The middle plate 11 is cut out in four places 90° apart. Two of these slots 180° apart fit the rectangular blocks 14. The outer plate 12 is fitted with similar studs 15 carrying blocks 16 like those in the inner plate. These blocks 16 fit into the other two spaces in the middle plate. The inner plate 10 is fixed to the spindle of the machine. The middle plate can move in a straight line on the inner plate and the outer plate can slide on the middle plate in a line at right angles to the line on which the middle plate moves with relation to the inner plate. The combined motion of these two plates produces a complete floating arrangement, permitting movement in any direction in a plane at right angles to the axis of the spindle within the limits of the slots in the plates.

The outer plate has three adjustable jaws 17 pivoted to it. The chuck by means of these jaws grips the work and rotates it when held on centers external to it but in line with the center of the spindle. Even though the work at the points of contact with the chuck be not concentric with the spindle or of irregular shape, the grip of all the jaws on the work will be under uniform pressure.

The jaws 17 are pivoted on the outer plate 12 and each is provided with a cam-shape serrated section or jaw on the side of its pivot nearest the center of the chuck to grip the work. A gear segment on the opposite side of the pivoted jaw 17 is operated by an internal ring gear 18, also held rotatably in the outer plate to move the jaws toward and from the work. The cam-shaped end of each jaw is so formed that the greater the force applied to resist the rotation of the work the tighter the jaws will grip it.

The gear 18 is operated by a hand lever fixed thereto. A shaft 19 has a gear or pinion 20 thereon meshing with a gear 21 on the power spindle 22 of which the inner plate 10 is an integral part. As so far described this is the old Powell chuck. A friction arrangement is shown in Fig. 7 comprising three spring plungers 23 carried by the retaining ring 24. They bear on the internal gear 18 and hold it frictionally.

It was found that when this chuck was stopped in a position where, in order for the three jaws 17 to make contact with the work, it was necessary to raise the equalizer plates, the weight of the plates plus the force necessary to overcome the friction between them in some cases was sufficient to spring or bend the work out of alignment. This resulted in the finished journal being slightly eccentric with respect to the wheel turned on some other machine.

The principal object of this invention is to provide an improved centering device which will avoid this difficulty. Two brackets 25 are used, one mounted on the front and the other on the back of the spindle housing. Each bracket carries two pivoted arms 26, each provided with a roll 27 mounted on the free end thereof. The two rolls on each side are held in contact with the two movable plates 11 and 12 of the chuck by means of plungers 28 operated by adjustable springs 29. Said plungers work generally toward the center. The four rolls 27 are located two on the front and the other two on the back and at a central angle of about 100° between the points of contact between the rolls and their plates. The springs 29 are so adjusted that the rolls carry the weight of the plates and the chuck runs concentric with the spindle when there is no work in it.

When the jaws of the chuck grip irregular work and throw the equalizing plates out of line with the spindle, the springs 29 expand and contract and keep the rolls always in contact with the plates. The work is not sprung or bent out of center and the journal will not be turned on an eccentric axis. Otherwise the chuck works the same as has been the case heretofore, and the only addition is in the improved centering device.

Although I have illustrated and described only a single form of the invention and shown it as applied to a specific form of clutch, I am aware of the fact that changes can be made therein by any person skilled in the art and it can be applied to other forms of clutches without departing from the scope of the invention as expressed in the claims. Therefore I do not wish to be limited to the exact form shown, but what I do claim is:

1. In a chuck for an axle lathe, the combination with two plates slidably connected, the rear one also being slidably mounted on a different axis, whereby the front plate is capable of floating in all directions, and gripping jaws carried by said front plate, of a centering device connected with the two plates for exerting a yielding upward pressure on them at all times.

2. In a chuck, the combination with a floating plate, and jaws carried thereby for gripping the work, of yielding means for engaging and supporting the plate at two points below the center on opposite sides of the bottom of the plate.

3. In a chuck, the combination with two plates floatingly connected and work engaging jaws carried by one of them, of sets of rollers engaging the edges of said plates on opposite sides below their centers to support their weight, and adjustable springs radially mounted for individually supporting the rollers and consequently the plates.

4. In a chuck, the combination with two plates floatingly connected and work engaging jaws carried by one of them, of sets of rollers engaging the edges of said plates on opposite sides below their centers to support their weight, freely pivoted arms on the free ends of which the rollers are mounted, and springs for individually supporting the rollers and consequently the plates for the purpose described.

In testimony whereof I have hereunto affixed my signature.

ROBERT H. HOLTON.